F. A. POCOCK.
STORAGE BATTERY.
APPLICATION FILED FEB. 15, 1915. RENEWED APR. 29, 1919.
1,323,721. Patented Dec. 2, 1919.
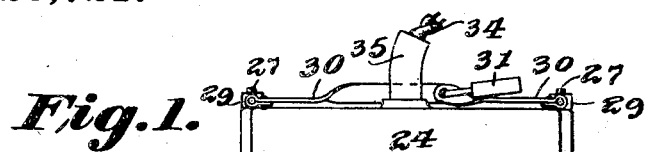
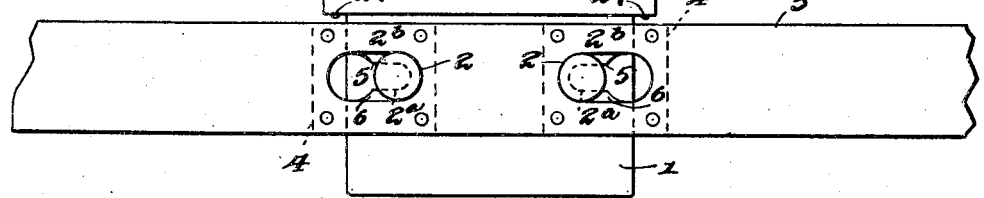
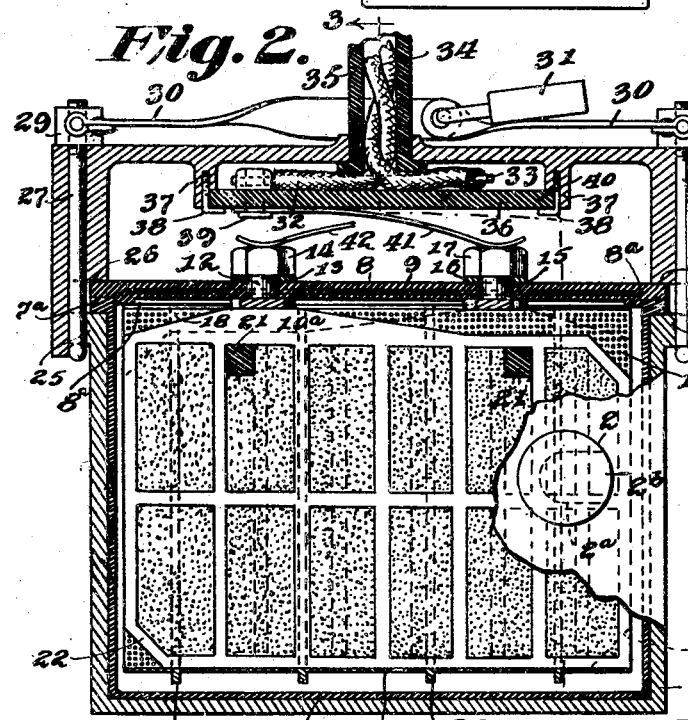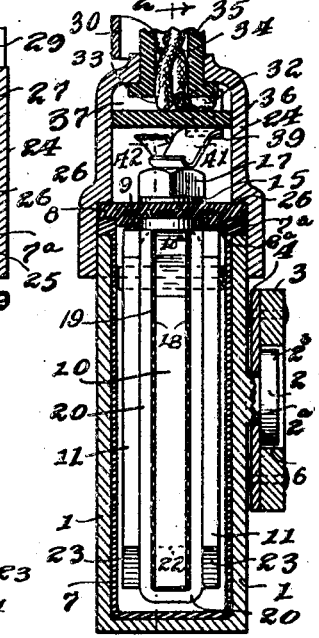
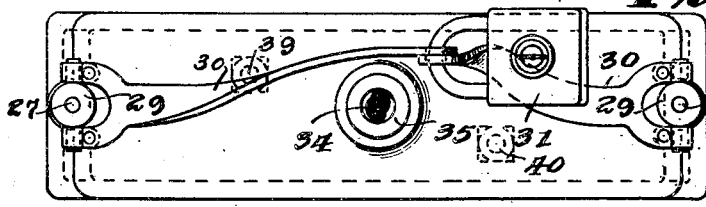
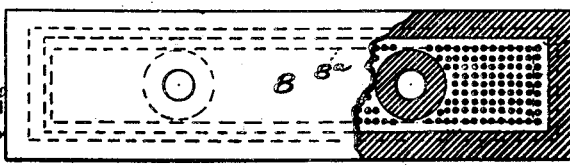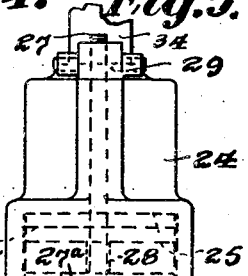

UNITED STATES PATENT OFFICE.

FRANCIS A. POCOCK, OF PHILADELPHIA, PENNSYLVANIA, ASSIGNOR TO W. S. RUSSELL, TRUSTEE, OF CARLISLE, PENNSYLVANIA.

STORAGE BATTERY.

1,323,721. Specification of Letters Patent. Patented Dec. 2, 1919.

Application filed February 15, 1915, Serial No. 8,262. Renewed April 28, 1919. Serial No. 293,344.

*To all whom it may concern:*

Be it known that I, FRANCIS A. POCOCK, a citizen of the United States, residing at Philadelphia, in the county of Philadelphia and State of Pennsylvania, have invented certain new and useful Improvements in Storage Batteries, of which the following is a specification, reference being had therein to the accompanying drawing.

The invention relates especially to storage batteries which are small and made in single units so as to be readily portable. Batteries of this type are especially adapted for supplying current to operate small electric lamps such as are commonly used by workmen in mines and other dark places. The object of the invention is to provide a battery of this class having its parts arranged to prevent any possible short-circuiting of the elements when the battery is moved to unusual positions. A further object is to provide an improved arrangement of parts for supporting the elements of the battery. A further object is to provide improved means for sealing the battery in a manner to permit ready opening for inspection and cleansing. Another object is to provide improved means for connecting the battery terminals with the lead wires. A still further object is to provide an improved means for attaching the battery to a miner's belt. The above and other objects will be fully understood from the following description of the accompanying drawings, which set forth and illustrate the embodiment of the invention which is preferred, it being understood that the invention can be embodied in other ways without departing from the spirit of the invention.

Referring to the drawings,

Figure 1 is a side view showing the battery attached to a section of a miner's belt;

Fig. 2 is a side view of the battery partly in section along the line 2—2 of Fig. 3;

Fig. 3 is a sectional view of the battery taken along the line 3—3 of Fig. 2;

Fig. 4 is a plan view;

Fig. 5 is a fragmentary end view with a part broken away;

Fig. 6 is a detail view, partly in section, of the combined cover and plate support.

Referring to the drawings, 1 represents, as a whole, the main body part of the battery case which can be formed of any suitable material, preferably a light metal such as aluminum or suitably prepared papier-mâché. Secured to or formed integrally with the casing 1 are two studs or buttons 2, 2 each having a central hub part 2ª and an outer flange part 2ᵇ. 3 represents a belt such as is commonly used by miners for carrying the storage batteries for their lighting systems. 4, 4 are metal plates riveted to the belt at a suitable distance apart, each plate being provided, as shown in Fig. 1, with a bayonet slot 5. Each of the two slots 5, 5 is large enough at its outer end to receive the flange 2ᵇ of the corresponding button and at its inner end is of such a width as to closely embrace the hub part 2ª of the button. It will be seen that by bending or looping the belt the two plates 4, 4 can be brought together sufficiently to receive the flange parts of the buttons. Then by straightening the belt the two plates 4, 4 are moved away from each other and the hubs 2ª, 2ª of the buttons are engaged in the narrower parts of the slots. The belt can be provided with apertures 6, 6 adapted to receive the flange parts 2ᵇ of the buttons. It will be seen that with this construction the battery can be easily attached to or detached from the belt and that when attached it is firmly held against slipping, the relative freedom of movement for the battery along the belt being a disadvantageous feature of earlier constructions.

Mounted within the main external casing 1 is a lining 7 which is preferably formed of soft rubber. According to earlier practice in batteries of this class the lining or inner case has been formed of hard rubber which is brittle and which immediately breaks upon the accidental breakage of the external casing. Therefore, when the external casing is broken the simultaneous cracking of the lining inner casing permits the electrolyte to escape and the battery to become useless. By my invention I provide a soft rubber lining which will yield upon the breaking of the outer casing, but which will not become broken or cracked so as to permit the escape of the electrolyte. It will be observed that the lining 7 is provided at its top with an out-turned flange 7ª which extends over the top of the main outer casing. The purpose of this will presently appear.

8 is a diaphragm or partition plate which rests upon the above mentioned out-turned flange 7ª of the inner rubber lining 7 and serves as a cover for the lower chamber, as a separator between the chambers, and as a support for the electrodes. This cover 8 is preferably formed of soft rubber and has embedded in it, to stiffen and strengthen it, a metallic sheet 9. This sheet 9 is perforated at a number of points so as to permit the two layers of rubber on opposite sides of it to be vulcanized together through the apertures. The plate 9 terminates at its sides and ends short distances from the sides and ends of the rubber plate 8 so as to provide a mass of resilient compressible rubber immediately adjacent and above the aforesaid rubber flanges 7ª. The cover 8 is preferably formed along its periphery on the under side with a small downward projecting rib 8ª which engages and supports the inner top parts of the soft rubber casing 7, thus holding this lining in firm engagement with the walls of the rigid outer casing 1.

The battery grids or plates are supported on the above mentioned cover plate 8. The battery plates or grids themselves can be of any usual or preferred construction and the invention is not limited as concerns the details of the plates. I prefer, however, to use plates of the sorts shown in my copending application for battery grids filed March 6, 1915, and bearing Serial Number 12,582. As shown, there are one or more central positive plates 10 and two or more side negative plates 11, 11. The positive plate, as shown in Fig. 2, is provided at one end with an upward projection 10ª to which there is secured an upward extending supporting stud 12. This stud 12 is preferably formed initially as a separate piece of metal and is then burned or welded onto the top of the grid, as shown. The stud projects upward through the cover plate 8, the plate 9 being provided with a large aperture so as to insure a mass of rubber completely surrounding the stud. The stud is held in place by means of the washer 13 and the nut 14. It will be seen that by tapping the nut the rubber of the cover plate 8 is closely clamped between the washer 13 and the head of the stud 12, thus making a tight joint around the stud.

The two negative plates are similarly secured to a stud 15 similar to the aforesaid stud 12, this being held in place by the washer 16 and the nut 17.

The central positive plate is separated from the side negative plates by a separating means 18 of usual form. Preferably, however, instead of providing two distinct separators I provide a single separator which is U-shaped in section, as shown in Fig. 3, this extending around the bottom of the central positive plate. As shown, the separator comprises a main perforated plate 19, which is apertured and which lies close to the positive grid on both sides. Ribs 20 are also provided which extend vertically on each side of the positive plate and across the bottom thereof. For tying the positive and negative plates together and for supporting the separator I provide two transverse bars 21, 21 of hard rubber, glass or other insulating material. These extend through the positive plate, through both sections of the separator and through both negative plates. By means of these supporting bars I am enabled to utilize each of the studs 12 and 15 for supporting each of the elements mentioned. In this way they are tied together and no one of them can move relatively to the others.

The corners of the plates are preferably cut away as indicated at 22 for the positive plate and at 23 for the negative plates. The positive plate is beveled off at two corners only and the negative plates are beveled off at the opposite two corners only. It is well known that, notwithstanding the greatest care in the preparation of the active elements of the battery and the greatest care in their use, a certain amount of finely divided material constantly cracks off from the active material of the positive plate and remains loose in the electrolyte. This cracking off of the material is increased when the construction is such that the electrolyte can wash against it as the battery is changed from one position to another. By my construction I have so arranged the separator 18 as to reduce this washing to a minimum, and, further, by extending the separator across the bottom of the plate I have provided for the catching of some of the material, even after loosened from the plate. The vertical ribs 20 serve to prevent any rapid rush of electrolyte from one end of the cell to the other, either across the upper portions thereof or along the bottom. But, notwithstanding these precautions it is expected that a small amount of loose material will ultimately find its way into the bottom of the cell below the plates. It has been the common practice heretofore to support the plates from the bottom of the cell by means of transverse ribs secured to or formed integrally with the bottom. These ribs served to collect this cracked off material which ultimately accumulates to such an extent as to short-circuit the positive and negative plates, thus putting the battery out of service. By my invention I have supported the plates entirely from the top, thus eliminating the cross-supporting ribs and avoiding any possibility of cross-circuiting of the battery at these points. It is still possible, however, with my construction, for the cracked off material to accumulate at the corners of the casing, and to prevent short-circuiting at the corners I have beveled off the plates in the manner described, that is, at each corner either the positive plate or the two negative plates are beveled off so as to avoid contact with any loose material which may accumulate in the corner.

24 is the cover for the cell, this being preferably formed of the same material as the main body part 1. The body part 1 is formed at its ends with outward projecting flanges 25, 25 and the cover 24 is made large enough to extend over these flanges. The cover is provided along its entire inner periphery with a shoulder 26 adapted to rest upon the outer top edge parts of the rubber plate 8.

Suitable means are provided for drawing the cover 24 downward with respect to the casing 1, thus pressing the shoulder 25 against the edges of the plate 8 and compressing the said edges together with the flange 7$^a$ on the inner casing 7. In this way the battery is tightly sealed. It will be seen that when this compressing action takes place the flange 7$^a$ is stiffened by the aforesaid rib 8$^a$ on the plate 8, the plate 8 itself being stiffened by the metal 9 embedded therein. Preferably the means for clamping the cover 24 in place comprises vertical L-shaped studs or pins 27, 27 which extend through apertures in the cover and through notches 28 in the flanges 25 formed on the casing 1. The lower ends of the studs 27, 27 are bent over, as indicated at 27$^a$ in Fig. 5. Means are provided at the tops of the studs for tightening them. Any well known means can be provided, but for purposes of illustration I have shown the studs as threaded and provided with nuts 29, 29 which can be turned. When the cover is to be put in place the parts 27$^a$ of the studs are turned outward and thus lie below the downward projecting flange of the cover. When the cover is in place the studs lie in the notches 28 and can be turned to the position indicated in Fig. 5 to engage the flanges 25. Then the nuts 29 can be turned to tighten the studs and draw the cover down in place. It will be observed that when the nuts are once tightened the parts 27$^a$ are held against turning outward by the downward projecting flange of the cover. The walls of the upper casing section being substantially in the lines of the walls of the lower casing section, the edges of the two sections are forced together along the same lines and they firmly compress the edge parts of the plate 8 and the flange 7$^a$ to form a liquid-tight and air-tight joint.

Preferably the nuts are provided with pivoted levers 30, 30 which can be extended horizontally toward the center of the cover. The ends of the levers are provided with eyes by means of which they can be locked together by padlock such as that indicated at 31. When the padlock is in place it is impossible for the battery to be opened, thus insuring against any tampering with it by the workman.

The lead wires for the battery are indicated by 32 and 33, these being formed into a cable, as indicated at 34. The cable 34 extends through an aperture in the top of the cover and for a short distance from the cover it is protected by means of a heavy tubing 35 of soft rubber.

Mounted within the cover is a plate 36 of hard rubber or other suitable insulating material, this being mounted on bosses 37, 37 and held in place, if necessary, by devices such as the pins 38, 38. The wires 32 and 33 are connected respectively to terminals 39 and 40 which project through the plate 36 and are connected at their lower ends with springs 41 and 42. These springs are so arranged that when the cover is in place they will engage with the tops of the studs 12 and 15, respectively, or at least with the nuts 14 and 17 on these studs, the springs serving as primary contacts, and the studs as electrode terminals. It will be seen that by the engagement of the springs with the studs the connections from the battery elements to the wires 32 and 33 are completed.

The advantages incident to my improved construction will be very apparent from the foregoing description. For instance, it will be understood that during use the battery is tightly sealed, so that no leakage can occur even if the battery is placed on its side or inverted. The lock 31 prevents the workman from opening the battery at any time. Upon returning from the day's work the workman can detach the battery from his belt and turn it into the battery man to be recharged. The battery man unlocks the cover and removes it, thus detaching the cord 34 and breaking the connections to the battery terminals. Connections can then be made in any usual or preferred way with the charging terminals. It will be seen that to effect charging it is not necessary to disturb the plates in any way and the main battery space remains normally sealed. However, the plate 8 during charging is held upon the walls of the casing only by gravity and is free to rise intermittently to permit the escape of the gases which are given off during the charging operation. In case the battery man finds it necessary to inspect the plates or to supply new electrolyte or to remove loose cracked off material from the casing it is only necessary for him to take hold of the terminals and lift the entire active part of the battery out of its case.

The mounting of the plates on the rubber cover 8 is of especial importance for the reasons already pointed out, namely, that there is an avoidance of short-circuits which have heretofore frequently occurred at the transverse bottom ribs which were heretofore commonly employed for supporting the plates. With my construction, without any transverse supporting ribs for the plates, any loose material in the cell can slide freely to the corner instead of collecting at an intermediate point when the cell is tilted. And short-circuiting at the corner is prevented by the beveling off of either the positive plate or the negative plates. It will be seen that with only two supporting devices, namely the two studs 12 and 15 I have provided two points of support for each plate. Each plate is directly connected with one of the studs and is indirectly connected with the other of the studs through the transverse bars 21 and the companion plate. By this construction the plates are very firmly connected with the cover. The transverse bars 21 are placed at the top of the plates and no short-circuiting through them is possible as they themselves are formed of insulating material and their position is such that no cracked off material can possibly accumulate on them.

The covers can, if desired, be numbered and corresponding numbers placed on the body parts of the casings, so that, after charging, each casing can receive its own cover. This, however, is not essential, as the parts are interchangeable and any cover will fit any casing. As concerns the cover itself, it will be observed that the plate 36 is detachably held in place and can be loosened by turning the pins 38 so as to permit inspection of the points of connection of the ends of the lead wires 32 and 33.

What I claim is:

1. In a portable storage battery cell having a lower chamber for the electrolyte and electrodes and having an upper chamber, the combination of a lower casing section consisting of walls which directly inclose the electrolyte and electrodes, an upper casing section having walls alining vertically with the walls of the lower section, a transversely arranged plate or partition between the chambers arranged to have its edge parts clamped in position between the adjacent edges of the upper wall section and the lower wall section to form a liquid and gas tight joint, the electrodes in the lower chamber and the electrode terminals and the primary contacts in the upper chamber normally separable from the electrode terminals when the upper casing section is released from the partition plate and from the lower casing section.

2. In a portable storage battery cell having a lower chamber for the electrolyte and the electrodes and also an upper chamber, the combination of a lower casing section consisting of walls which directly inclose the electrolyte and electrodes in said lower chamber, an upper casing section having walls alining vertically with the walls of the lower section, a transversely disposed partition plate arranged with its edges between and clamped by the adjacent edges of the upper and lower wall sections, the electrodes in the lower chambers supported on said partition plate, means engaging with the upper section and with the lower section for binding them together and clamping the transverse plate between them, the electrode terminals and the primary contacts in the upper chamber, the electrode terminals being supported on the partition plate and the primary contacts being secured to and normally removable with the upper casing section.

3. In a portable storage battery cell having a lower chamber for the electrolyte and the electrodes and also an upper chamber, the combination of a lower casing section consisting of walls which directly inclose the electrolyte and the electrodes, the soft rubber lining 7 loosely supported in the lower casing section and having the clamping flange 7ª positioned between the adjacent edges of the casing sections, the transversely arranged soft rubber partition plate 8 with the embedded stiffening metallic plate 9, and means for binding together the casing sections and the said rubber elements 7 and 8.

4. In a portable storage battery cell having a lower chamber for the electrolyte and the electrodes and also an upper chamber, the combination of a lower casing section which incloses the electrolyte chamber, a transverse partition plate having its edges positioned between the adjacent edges of the upper and the lower casing sections, a series of devices for clamping together the said casing sections and the said partition plate, and a lock which holds all of the clamping devices of the said series against movement.

In testimony whereof, I affix my signature in presence of two witnesses.

FRANCIS A. POCOCK.

Witnesses:
EDWARD H. CLOUD,
WILLIAM A. GRETZINGER.